United States Patent [19]

Ota et al.

[11] Patent Number: 4,815,197
[45] Date of Patent: Mar. 28, 1989

[54] PROCESS FOR PRODUCING MAGNETIC HEAD

[75] Inventors: Hiroyuki Ota; Kazuhiko Sato, both of Saitama, Japan

[73] Assignee: Pioneer Electronic Corporation, Tokyo, Japan

[21] Appl. No.: 181,939

[22] Filed: Apr. 15, 1988

[30] Foreign Application Priority Data

Apr. 15, 1987 [JP] Japan .................................. 62-90726

[51] Int. Cl.$^4$ .............................................. G11B 5/42
[52] U.S. Cl. ........................................ 29/603; 360/120
[58] Field of Search ................. 29/603; 360/119, 120, 360/125–127

[56] References Cited

U.S. PATENT DOCUMENTS

| | | | |
|---|---|---|---|
| 3,479,738 | 11/1969 | Hanak | 29/603 |
| 4,704,788 | 11/1987 | Eckstein | 29/603 |
| 4,769,898 | 9/1988 | Ono et al. | 29/603 |

*Primary Examiner*—Carl E. Hall
*Attorney, Agent, or Firm*—Sughrue, Mion, Zinn, Macpeak and Seas

[57] ABSTRACT

A process for producing a magnetic head having a precisely defined recording width but which can be produced using simple process steps. Track width controlling grooves are formed in at least one of two core block halves made of a magnetic material. A thin film of a nonmagnetic material, which serves as a gap spacer, is deposited on the bottoms of the track width controlling grooves and portions therebetween. A thin film layer of a metallic magnetic material is formed on the nonmagnetic thin film, and a thin film layer of a metallic magnetic material is formed on the surface of the other core to be brought into abutment against portions between the track width controlling grooves. The two core halves are then joined to form a core block with the thin film of metallic magnetic material on one core block half facing the thin film of metallic magnetic material on the other core block half. The thin films of metallic magnetic material are then etched away from all areas except where they contact each other as a result of the abutment of the two core block halves.

14 Claims, 3 Drawing Sheets

PROCESS FOR PRODUCING MAGNETIC HEAD

BACKGROUND OF THE INVENTION

The present invention relates to an improved process for producing a magnetic head of a type used in a video tape recorder, digital audio tape recorder, or the like, and which is mounted at a selected location on the periphery of a drum which rotates as magnetic tape is guided past it to achieve helical recording or reproduction.

Recent technological advances toward higher packing densities in magnetic recording have been remarkable. This has caused a growing need to reduce the track width produce by magnetic heads both in recording and playback modes, as well as the width of the magnetic gap, leading to a corresponding increase in the closeness of dimensional tolerances. Taking 8-mm video tape recorders and digital audio tape recorders as examples, the magnetic head produces a track width of as small as about 10 microns and a gap width of 0.2 to 0.3 microns.

One of the currently most popular tape recorders of the type that employs magnetic heads mounted on a rotating drum is a home video tape recorder. The magnetic gap of a head in such a tape recorder, which makes sliding contact with magnetic tape, and the adjacent area to the gap are shown in FIG. 1. Shown by 1a and 1b are core block halves that combine together to form a magnetic circuit in the head; 2 is a glass material filled in track width controlling grooves formed in the mating surfaces of core halves 1a and 1b, the dimension of each core half between adjacent glass-filled grooves defining a track width; and 3 is a gap spacer inserted between the core halves 1a and 1b in the portion of the track width, with the thickness of this gap spacer providing a magnetic gap width.

A process for fabricating the magnetic head shown in FIG. 1 is described hereinafter with reference to FIG. 2. First, each of the core half 1b and the core half 1a, the latter being provided with a groove for accommodating a coil winding, is machined to form a plurality of track width controlling grooves, adjacent ones of which are spaced apart by a distance corresponding to the track width. After grinding and polishing the mating surfaces of the two core halves to a speculate finish, a gap spacer 3 whose thickness is half the magnetic gap width is deposited on each of the speculate surfaces. Subsequently, the core halves 1a and 1b are brought into abutment against each other in such a manner as to attain exact registry between opposite track forming portions. Each of the track width controlling grooves is then filled with a glass material 2 to form a core block of the shape shown in FIG. 2. This core block is cut along lines through the track width controlling grooves including the glass 2, thereby dividing the block into discrete magnetic heads, one of which is shown enlarged in FIG. 1.

The method described above with reference to FIG. 2 includes preparation- of a single core block containing a plurality of magnetic heads and cutting the block into discrete heads covering the area indicated by 5 in FIG. 2. This approach, however, has the disadvantage that a slight misalignment between the track portions to be brought into abutment against each other or irregularities n the pitch of the track width controlling grooves will cause the portion of the core half 1a defining the track width to be out of registry with the corresponding track width defining portion of the core half 1b, as shown in FIG. 3. If this situation occurs, only the area where the two core halves are in actual abutment against each other can provide an effective magnetic gap, and hence the track width is decreased. Such misalignment will cause a serious problem in a magnetic head having a small track width of only about 10 microns. In order to avoid such problems, very close tolerances are required in machining and joining the core halves 1a and 1b, but imposing such tolerances is unavoidably accompanied by a reduction in the production rate of the magnetic heads.

One approach that has been taken t prevent the occurrence of such problems is to cut track width controlling grooves in one core half (1b in the case shown in FIG. 4) in such a way that the area between adjacent grooves is wider than the desired track width. That core half is brought into abutment against the other core half 1a in which track width controlling grooves are cut to leave portions as wide as the intended track width. The advantage of this method is that the desired track width is attained even if there occurs a slight misalignment between the track portions of the two core halves that are brought into abutment against each other.

The fabrication of conventional heads including the one shown in FIG. 4 involves preparing a single block containing as many as several tens of magnetic heads as shown in FIG. 2. However, it is extremely difficult to attain a uniform gap length in all block halves by this approach, and the presence of even minute amounts of foreign matter or deviations from the prescribed dimensional precision in the gap surface of either block half will result in a gap length greater than the thickness of the nonmagnetic spacer. If the magnetic head to be produced is to have a small gap length, any deviation of gap length from the prescribed value will become a considerably significant factor.

As already mentioned, in tape recorders such as video and audio digital tape recorders, the magnetic heads are mounted on a rotating drum and magnetic tape wrapped partially around the drum is moved across the heads as the drum is rotated, thereby achieving "inclined azimuth" recording. If the magnetic head shown in FIG. 4 is used in this type of recording, the following problem will occur.

In helical-scan inclined-azimuth recording, the track width of a head is set to be greater than the pitch of recording/reproducing tracks, and the track width is determined by overwriting. In this case, the edge of each recorded track is determined by the end of the magnetic gap of a recording head. If the ends of the magnetic gap are in exact registry on both sides as shown in FIG. 1, a small magnetic flux will leak from these ends and the magnetic edge is exactly determined to produce recording patterns as shown in FIG. 5, wherein 62 denotes the region where information is recorded with a (+) azimuth head and 6a signifies the region where information is recorded with a (−) azimuth head. However, if information is recorded with the magnetic head shown in FIG. 4, a large flux leaks from the end of the magnetic gap rendering it indistinct since the flux extends beyond the mechanical gap end, causing undesired recording effects.

In addition, as shown FIG. 6, the region 7 that determines recording magnetization in the vicinity of the magnetic gap becomes curved, causing curved recording of a signal in that region 7 with respect to the magnetic head gap, as illustrated in FIG. 7. FIG. 8 shows the track pattern produced by recording with this magnetic head. Reference symbol δ in FIG. 8 indicates information which is recorded in the region 7. Since the azimuthal angle at which information is recorded in the region 7 differs from the mechanical azimuthal angle of the magnetic head, the portion indicated by δ is null in that it will not contribute to the reproduced output for that track. In video and digital audio applications where the track width is extremely small, the portions that do not contribute to the reproduced output are unduly increased, resulting in an overall smaller output level.

SUMMARY OF THE INVENTION

An object, therefore, of the present invention is to provide a process by which a magnetic head that is free from the aforementioned drawbacks of the prior art and which produces a high reproduction output by eliminating null recording portions due to leakage flux. It is further an object of the invention to provide such a process with which magnetic heads can be produced with a high yield without requiring an extremely high precision in bringing opposite track portions into abutment against each other or machining such track portions.

The above-stated and other objects of the present invention are attained by a process comprising preparing two core block halves from an oxide magnetic material, machining a plurality of track width controlling grooves in at least one core block half, forming a gap spacer on the bottoms of the track width controlling grooves as well as on the portions between adjacent grooves, forming at least one layer of a thin film of a metallic magnetic material on the gap spacer, forming at least one layer of a thin film of a metallic magnetic material on the mating surface of the other core block half made of an oxide magnetic material, joining the two core block halves, and removing the thin films of a metallic magnetic material except from the mating surfaces of the two core block halves.

DESCRIPTION OF THE PREFERRED EMBODIMENTS

A first preferred embodiment of the present invention is described hereinafter with reference to FIGS. 10 to 16.

Figure 10:
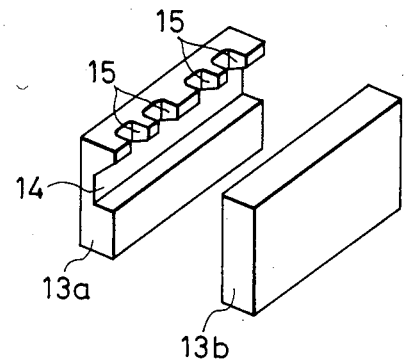
FIGS. 10 to 14 are perspective views illustrating process steps of fabricating the magnetic head shown in FIG. 9.

Indicated by 13a and 13b in FIG. 10 are two core block halves made of a ferrite such as a commonly employed oxide magnetic material suitable for use as a core material in a magnetic head for a tape recorder of the type contemplated by the present invention. A groove 14 for accommodating a coil winding is cut in the surface of the core block half 13a. A plurality of track width controlling grooves 15 are also cut in the surface of the core half 13a in such a way that a length of material corresponding to the track width is left between adjacent grooves 15.

Figure 11:
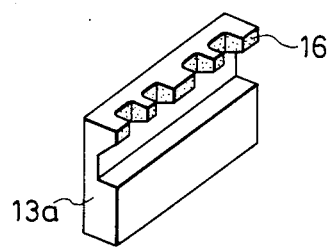

The mating surfaces of the core block halves 13a and 13b are ground and polished to a speculate finish. Thereafter, as shown in FIG. 11, a thin film of a nonmagnetic material which is to serve as a gap spacer 16 is formed to a thickness of 0.2 to 0.3 microns on the bottoms of the track width controlling grooves 15 and the portions between adjacent grooves cut in the surface of the core block half 13a. This thin film may be formed by a suitable thin-film forming process such as sputtering or evaporation. The thickness of this thin film provides a magnetic gap having the thickness that is necessary for a video or digital audio magnetic head and which depends on the frequencies to be handled. Therefore, the thickness of this thin film is determined by the specific use of the apparatus in which the magnetic head is to be employed.

Figure 12:
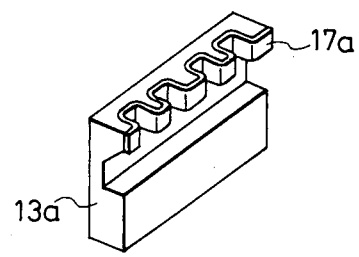

In the next step, a film 17a of a metallic magnetic material such as Permalloy is formed on the gap spacer 16, as shown in FIG. 12, to a thickness of 1 to 2 microns by a suitable thin-film forming process such as sputtering or evaporation.

Figure 13:
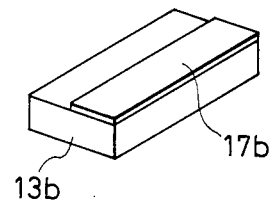

A shown in FIG. 13, a film 17b of a metallic magnetic material such as Permally is also formed to a thickness of 1 to 2 microns on the surface of the other core block half 13b including the area which is to be brought into abutment against the portions of the core block half 13a between track width controlling grooves 15.

The thickness of each of the Permalloy films 17a and 17b must be determined in accordance with the thickness of the magnetic gap in such a way that the magnetic flux leaking from these films will not exceed a prescribed value.

Figure 14:
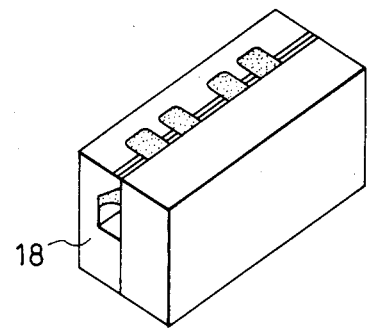

The thus-prepared core block halves 13a and 13b are joined together in such a way that, as shown in FIG. 14, the Permally films 17a and 17b are brought into abutment against each other. A glass material 12 having the characteristics as described below is melted and poured onto the upper edge portion of the groove 14 and into the track width controlling grooves 15 so as to bond the core block halves 13a and 13b together to form a single core block 18. If the temperature for this treatment is set at an appropriate value not lower than 800° C., the Permalloy films 17a and 17b fuse by themselves into a single entity.

Some glass materials when melted, exert a corrosive action on metals. By selecting glass materials having such a characteristic as well as an appropriate temperature not lower than 800° C., the Permalloy films 17a and 17b are etched in the areas where they are in contact with such glass material 12, thereby losing the magnetic characteristics inherent in Permalloy.

Figure 15:
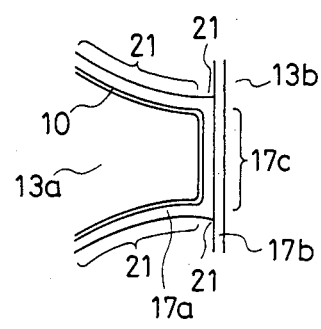
FIGS. 15 and 16 are enlarged plan views showing a magnetic gap portion from which Permalloy films are selectively etched away.
Figure 16:
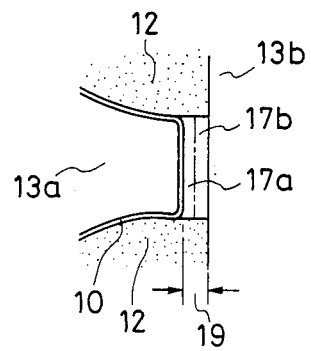

This situation is shown diagrammatically in FIGS. 15 and 16. The Permally films 17a and 17b fuse by themselves in the area 17c where they contact each other, thereby forming a single entity, and those areas 21 of the Permalloy films which contact the glass 12 are etched away as shown in FIG. 16.

Figure 9:
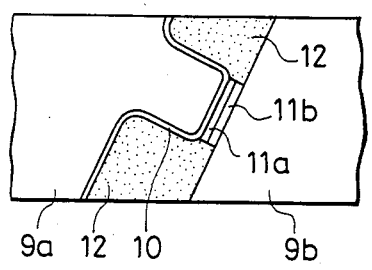
FIG. 9 is an enlarged plan view showing a magnetic gap portion of a magnetic head produced according to a preferred embodiment of the present invention.

The core block 18 is then cut along lines through the track width controlling grooves 15 including the glass 12, as in the prior art process, thereby dividing the block into discrete head chips, one of which is shown enlarged in FIG. 9, wherein 9a and 9b denote the ferrite core block halves, 10 is the gap spacer, 11a and 11b are the Permalloy films, and 12 is the glass material. The head clips are ground and polished to produce a cylindrical surface in the area that is to make sliding contact with magnetic tape. This surface is then lapped to produce a desired magnetic head.

Figure 1:
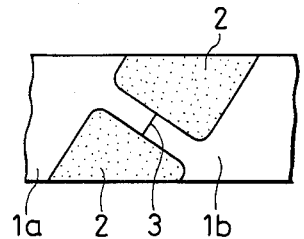
FIG. 1 is an enlarged plan view showing the magnetic gap portion of a prior art magnetic head.
Figure 2:
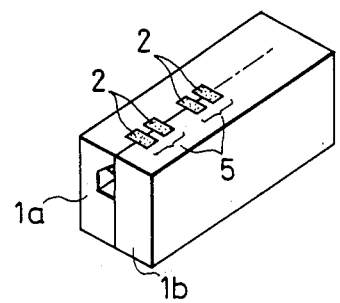
FIG. 2 is a perspective view illustrating how the magnetic head shown in FIG. 1 is fabricated.
Figure 3:
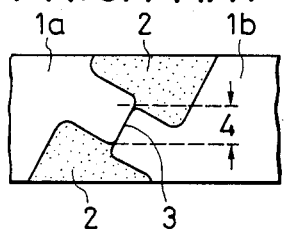
FIG. 3 is an enlarged plan view showing the situation where track mismatching occurs in the magnetic head shown in FIG. 1.
Figure 4:
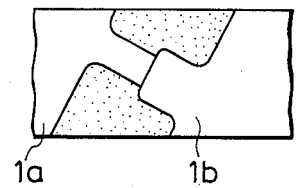
FIG. 4 is an enlarged plan view showing the magnetic gap portion of another prior art magnetic head.
Figure 5:
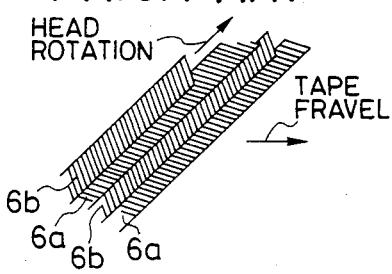
FIG. 5 is a plan view showing a recording pattern produced on a magnetic tap by helical-scan inclined-azimuth recording.
Figure 6:
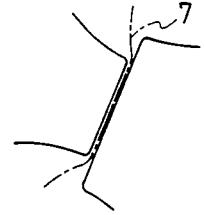
FIG. 6 is a plan view showing magnetic flux leakage from the magnetic head shown in FIG. 4.
Figure 7:
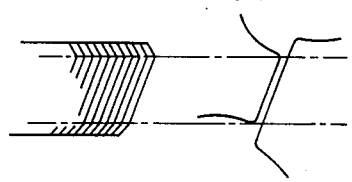
FIG. 7 is a front view of a magnetic tape on which information is recorded under the circumstances shown in FIG. 6.
Figure 8:
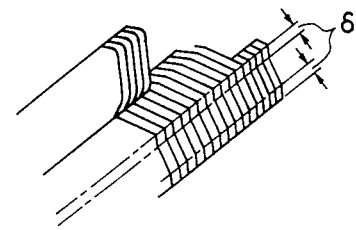
FIG. 8 is a front view of a magnetic tape on which helical-scan inclined-azimuth recording is performed under the situation shown in FIG. 6.

As described above, the magnetic head fabricated according to the present invention has track width controlling grooves 15 formed in only one of the two core block halves (9a in the embodiment discussed) in such a way that a predetermined track width is provided between adjacent grooves. The null recording portion indicated by δ in FIG. 8 which occurs in the resulting magnetic head, such as the one depicted in FIG. 4, on account of leakage flux from the magnetic head gap is in the range of 1 and 2 microns for a gap width of 0.2 to 0.3 microns. Therefore, if the thickness of the residual Permalloy films 17a and 17b in FIG. 16, namely, the dimension indicated by 19, is about 2 microns, the width of the null recording area δ due to leakage flux can be reduced to zero.

Figure 17:
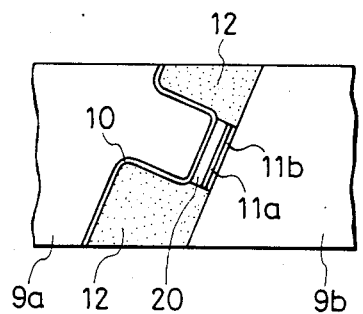
FIGS. 17 to 19 are enlarged plan views showing the magnetic portions of magnetic heads according to three other embodiments of the present invention.

FIG. 17 shows another embodiment of the present invention. In this embodiment, a film 20 made of a metallic magnetic material having a comparatively high hardness, such as Sendust alloy, is formed between the gap spacer 10 on the core block half 9a and the Permalloy film 11a. The Sendust alloy has a higher saturation flux density that Permalloy, and hence, compared with the magnetic head of the first embodiment the head furnished with the Sendust film 20 offers a sufficiently increased recording capability to enable satisfactory recording even on metallic-particle tapes. In addition, the hardness of the Sendust film 20 is sufficient to reduce possible wear of the head in areas around the magnetic gap, thereby contributing to an extended head life. Another advantage of using the Sendust film 20 is that, if its thickness is on the order of 2 microns, each of the Permalloy films 17a and 17b can be made to be extremely thin.

The magnetic head according to the second embodiment of the present invention may be fabricated by the following procedure: a gap spacer 16 is formed on a core block half 13a; the Sendust film 20 is formed on the gap spacer 16 by a suitable thin-film forming process such as evaporation or sputtering; then, a Permalloy film 17a is formed on the Sendust film 20 as in the first embodiment; subsequently, the two core block halves 13a and 13b are joined together by a glass material 12 as in the previous embodiment, with the Permalloy films 17a and 17b as well as the Sendust film 20 in the area where they contact the glass 12 being etched away by the corrosive action of the latter.

Figure 18:
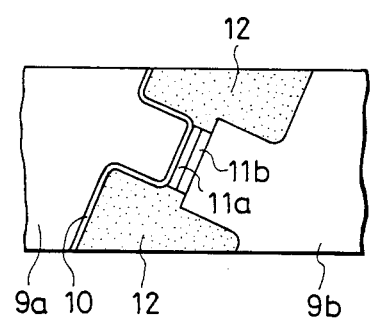

FIG. 18 shows still another embodiment of the present invention. In this embodiment, track width controlling grooves are also formed in the core block half 13b but at pitches that are greater than the track width defined by two adjacent track width controlling grooves 15 formed in the core block half 13a.

Figure 19:
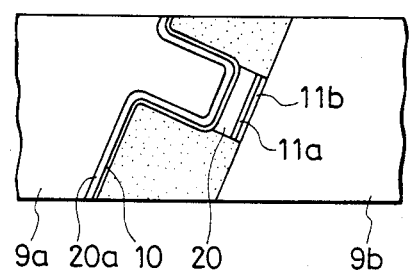

In a still further embodiment of the present invention shown in FIG. 19, a thin Sendust film 20a is formed between the gap spacer 10 and the core block half 9a fabricated as in the embodiment shown in FIG. 17. The magnetic head produced according to this fourth embodiment has the advantage of an even higher recording capability since the Sendust film having a high saturation flux density is provided on both sides of the magnetic gap. In order to produce this magnetic head, the Sendust film 20a is formed prior to the formation of the gap spacer 10 on the core block half 13a. The Sendust film 20 is not etched away by the glass 12 and remains intact because of the presence of the gap spacer 10.

In the embodiments described above, the Permalloy films 11a and 11b and the Sendust film 20 are etched away by the corrosive action of the glass material 12, but it should be understood that etching may be performed by other processes using corrosive chemicals.

As will be apparent from the foregoing description, the width of recording accomplished with the magnetic head of the present invention is determined by the dimension between adjacent track width controlling grooves formed in one of the two core block halves. Not only does this contribute to the exactness of the track width provided, but also the need to ensure extremely close tolerates in the pitch between adjacent track width controlling grooves and between the track portions of the two core block halves is eliminated. As a result, the process steps involved are simplified and the production rate is improved, realizing substantial cost reduction.

The thin film of metallic magnetic material left intact on one core block half will effectively reduce the leakage flux from the magnetic gap to a low level comparable to that attained by bringing the track portions on the two core block halves into precise abutment against each other. As a result, none of the recording tracks will have a null recording portion and the provision of a high reproduction output is ensured.

As a further advantage, the thin film of metallic magnetic material that is left intact on at least one side of the magnetic gap contributes a higher saturation flux density than a magnetic head employing only a core made of an oxide magnetic material. This enables recording even on magnetic tapes having high coercive force.

What is claimed is:

1. A process for producing a magnetic head comprising: forming track width controlling grooves in at least one of two core block halves made of an oxide magnetic material; forming a thin film of a nonmagnetic material, which is to serve as a gap spacer, on bottoms of said track width controlling grooves and on portions between adjacent ones of said grooves; forming at least one layer of a thin film of a metallic magnetic material on said nonmagnetic thin film; forming at least one layer of a thin film of a metallic magnetic material on a surface of the other core block half which is to be brought into abutment against the portions between said track width controlling grooves; joining the two core block halves to form a core block in such a way that the thin film of a metallic magnetic material on one core block half faces the thin film of a metallic magnetic material on the other one block half; and thereafter etching away the thin films of a metallic magnetic material from all areas except where they contact each other as a result of abutment of the two core block halves.

2. The process for producing a magnetic head of claim 1, wherein a thickness of said nonmagnetic material is in a range of 0.2 to 0.3 microns.

3. The process for producing a magnetic head of claim 1, wherein said metallic magnetic material comprises Permalloy.

4. The process for producing a magnetic head of claim 3, wherein a thickness of said metallic magnetic material is in a range of 1 to 2 microns.

5. The process for producing a magnetic head of claim 1, wherein said step of joining said two core halves comprises pouring a molten glass material onto surfaces of said two core halves to be joined together.

6. The process for producing a magnetic head of claim 5, wherein said glass material is a glass material exerting a corrosive action on metals.

7. The process for producing a magnetic head of claim 5, wherein said molten glass is at a temperature not exceeding 800° C.

8. The process for producing a magnetic head of claim 1, further comprising the steps of: cutting said core block along lines through said track width controlling grooves to divide said core block into discrete head chips, grinding and polishing said head chips to produce cylindrical surfaces in areas to make sliding contact with a magnetic tape, and lapping said cylindrical surfaces.

9. The process for producing a magnetic head of claim 1, further comprising the step of forming a film of a metallic magnetic material having a high hardness between said thin film of a nonmagnetic material and said at least one layer of a thin film of a metallic magnetic material.

10. The process for forming a magnetic head of claim 9, wherein said film of metallic magnetic material having a high hardness comprises Sendust.

11. The process for forming a magnetic head of claim 10, wherein a thickness of said film of metallic magnetic material having a high hardness is on the order of 2 microns.

12. The process for forming a magnetic head of claim 1, wherein track width controlling grooves are formed in both said core halves, the track width controlling grooves forming in one of said core halves having a pitch greater than the track width controlling grooves formed in the other core half.

13. The process for producing a magnetic head of claim 9, further comprising the step of forming a film of a metallic magnetic material having a high hardness on said bottoms of said track width controlling grooves and said portions between adjacent ones of said grooves prior to formation of said thin film of a nonmagnetic material which serves as a gap spacer.

14. The process for forming a magnetic head of claim 9, wherein said film of metallic magnetic material formed on said bottoms of said track width controlling grooves and said portions between adjacent ones of said grooves comprises Sendust.

* * * * *